(12) United States Patent
Janssens et al.

(10) Patent No.: US 10,597,490 B2
(45) Date of Patent: Mar. 24, 2020

(54) PROCESS FOR PURIFICATION OF CRUDE POLYETHER POLYOLS

(71) Applicant: BASF SE, Ludwigshafen am Rhein (DE)

(72) Inventors: Vincent Filip Janssens, Beveren-Waas (BE); Yassine Akhandaf, Borgerhout (BE)

(73) Assignee: BASF SE, Ludwigshafen am Rhein (DE)

( * ) Notice: Subject to any disclaimer, the term of this patent is extended or adjusted under 35 U.S.C. 154(b) by 53 days.

(21) Appl. No.: 15/757,392

(22) PCT Filed: Sep. 2, 2016

(86) PCT No.: PCT/EP2016/070692
§ 371 (c)(1),
(2) Date: Mar. 5, 2018

(87) PCT Pub. No.: WO2017/037219
PCT Pub. Date: Mar. 9, 2017

(65) Prior Publication Data
US 2018/0244843 A1    Aug. 30, 2018

(30) Foreign Application Priority Data

Sep. 4, 2015   (EP) .................... 15183912

(51) Int. Cl.
*C08G 65/30* (2006.01)
*C08G 65/26* (2006.01)
*B01D 29/00* (2006.01)
*B01D 29/82* (2006.01)

(52) U.S. Cl.
CPC ......... *C08G 65/30* (2013.01); *B01D 29/0093* (2013.01); *B01D 29/82* (2013.01); *C08G 65/2606* (2013.01); *C08G 65/2642* (2013.01)

(58) Field of Classification Search
USPC ........................................................ 528/402
See application file for complete search history.

(56) References Cited

U.S. PATENT DOCUMENTS

| | | | |
|---|---|---|---|
| 4,129,718 A | 12/1978 | Muzzio | |
| 4,137,398 A | 1/1979 | Muzzio | |
| 4,306,943 A | 12/1981 | Mori et al. | |
| 4,507,475 A | 3/1985 | Straehle et al. | |
| 2003/0158450 A1 | 8/2003 | Hasselaar et al. | |
| 2005/0215831 A1 | 9/2005 | Zieler et al. | |
| 2009/0143625 A1 | 6/2009 | Hasselaar et al. | |

FOREIGN PATENT DOCUMENTS

| | | |
|---|---|---|
| EP | 0050181 A1 | 4/1982 |
| EP | 0102508 A1 | 3/1984 |
| EP | 1292631 | 3/2003 |

OTHER PUBLICATIONS

International Search Report dated Nov. 8, 2016, in PCT/EP2016/070692, filed Sep. 2, 2016.
International Preliminary Report on Patentability dated Jul. 20, 2017, in PCT/EP2016/070692, filed Sep. 2, 2016.

*Primary Examiner* — Terressa Boykin
(74) *Attorney, Agent, or Firm* — Oblon, McClelland, Maier & Neustadt, L.L.P.

(57) ABSTRACT

A process for the purification of a crude polyether polyol is provided, where the crude polyether polyol is prepared by anionic polymerization of alkylene oxides in the presence of basic catalysts. The process includes neutralizing of the catalysts with mineral acid to form a salt, addition an adsorption agent and/or filter aid and removing the salt and adsorption agent and/or filter aid by filtration to form a filter. In a subsequent step, the filter cake is pressed to recuperate the polyether polyol.

17 Claims, 4 Drawing Sheets

PROCESS FOR PURIFICATION OF CRUDE POLYETHER POLYOLS

The invention relates to a process for purification of crude polyether polyols wherein the crude polyether polyols are prepared by anionic polymerization of alkylene oxides in the presence of basic catalysts.

Polyether polyols are commonly prepared by anionic polymerization of alkylene oxides. The alkylene oxides in the presence of basic catalysts such as alkali metal hydroxides or alcoholates are added to a starter molecule which contains at least two reactive hydrogen atoms in bonded form. This results in polyether polyols with free hydroxyl groups, part of which carry alcoholate groups in the terminal position as a result of the alkaline reaction medium. For the further use of the polyether polyol, particularly for the preparation of polyurethanes, the alcoholate radicals must be transformed into free hydroxyl groups in such a manner that the polyether polyols essentially do not contain any inorganic components which can be detected by ashing or showing a buffer effect.

The alkali-containing polyether polyols are, therefore, generally neutralized with inorganic or organic acids resulting in emulsions of aqueous salt solutions and polyether polyols. Subsequently, the water of the emulsions is removed by stripping under vacuum. The remaining salts which precipitate in the polyether polyol are separated by mechanical means.

From EP 0102508 a process for purification of crude polyether polyols is known. The process comprises the steps of mixing the crude polyether polyol with water and orthophosphoric acid, incorporating an adsorption agent in the reaction mixture, separating the resultant salts and the incorporated solid additives and removing the water from the polyether polyol by stripping. The separation of the salts and solid additives may be performed by means of filtration.

In the known purification processes the salts and solid additives are removed by filtration means wherein liquid passes through a filtration means such as plate filters, candle filters or chamber filters. The liquid phase then passes the filtration means and the remaining filter cake stays on the surface. The filter cake is then removed from the filter unit as waste. The filter cake comprises a considerable amount of liquid material including the desired product polyether polyol.

Waste disposal of the filter cake is problematic as the polyether polyols which adhere to the solid material are not easily degradable and complete incineration is not possible due to the mineral content of the filter cake which remains as slag.

Accordingly, a process for the purification of crude polyether polyols is provided, wherein the crude polyether polyols are prepared by anionic polymerization of alkylene oxides in the presence of basic catalysts, the process comprising the steps of:

neutralization of the catalysts with mineral acid wherein salts are formed, addition of adsorption agent and/or filter aid and removing the resultant salts and added adsorption agent and/or filter aid by filtration wherein a filter cake is formed, and wherein polyether polyols are recuperated from the filter cake in a subsequent step of pressing the filter cake.

Figure 1:
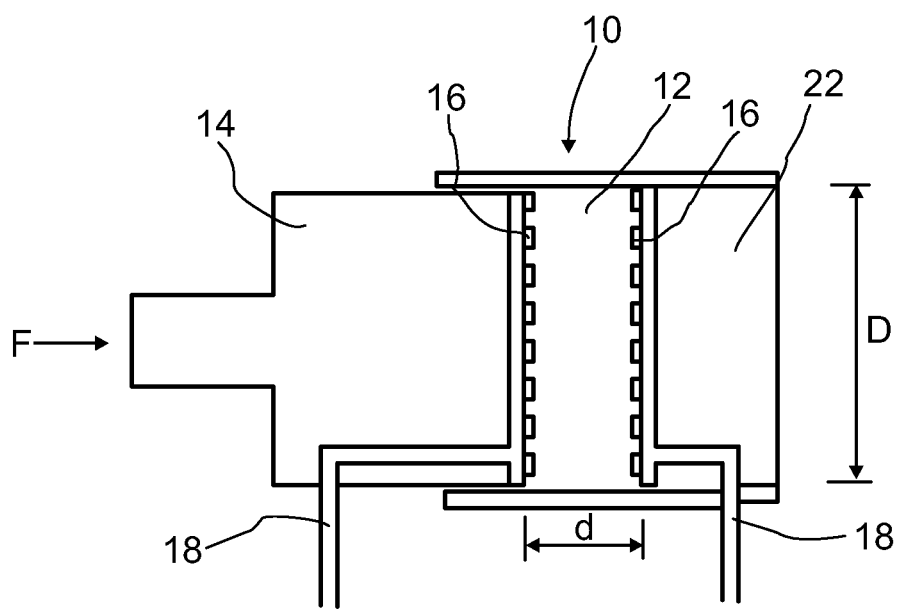
FIG. 1 shows a schematic view of a high pressure filter press 10 comprising a cylindrical housing 20.

In the following description, polyether polyols are also referred to as polyols for convenience.

The polyether polyols are prepared in accordance with well-known procedures. One or more optionally substituted alkylene oxides with 2 to 4 carbon atoms in the alkylene radical are added to a starter molecule which contains at least 2, preferably 2 to 8, and particularly 2 to 4 active hydrogen atoms in the presence of a basic catalyst.

Suitable alkylene oxides include 2,3-epoxypropanol-1,1,2- and/or 2,3-butylene oxide, styrene oxide and preferably ethylene oxide and 1,2-propylene oxide. The alkylene oxides may be used individually, alternatingly in sequence or as mixtures.

Suitable starter molecules include, for example: water, organic dicarboxylic acids such as succinic acid, adipic acid, phthalic acid and terephthalic acid, aliphatic and aromatic optionally N-mono-, N,N- and N,N'-dialkyl substituted diamines with 1 to 4 carbon atoms in the alkyl radical such as optionally mono- and dialkyl substituted ethylenediamine, diethylenetriamine, triethyl-enetetramine, 1,3-propylenediamine, 1,3- and/or 1,4-butylenediamine, 1,2-, 1,3-, 1,4-, 1,5- and 1,6-hexamethylenediamine, phenylenediamine, 2,4- and 2,6-toluenediamine, 4,4'-, 2,4- and 2,2'-diaminodiphenylmethane and mixtures of diaminodiphenylmethanes and polyphenylene polymethylene polyamines.

Other suitable starter molecules include alkanolamines such as ethanolamine, diethanolamine, N-methyl- and N-ethyl alkanolamines such as N-methyl- and N-ethyl-diethanolamine and triethanolamine, ammonia, hydrazine and hydrazides. Preferably used are multifunctional, particularly bi- and/or trifunctional, glycols such as ethylene glycol, 1,2-propylene glycol and trimethylene glycol, diethylene glycol, dipropylene glycol, 1,4-butanediol, 1,6-hexamethylene glycol, glycerine, trimethylolpropane, pentaerythritol, sorbitol and sucrose. The starter molecules may be used individually or as mixtures.

Commonly used catalysts are alkali alkoxides with 1 to 4 carbon atoms in the alkyl radical such as sodium methylate, sodium and potassium ethylate, potassium isopropylate and sodium butylate and preferably alkali hydroxides such as sodium hydroxide and preferably potassium hydroxide. The catalyst is normally used in an amount of 0.02 to 3 weight percent, preferably of 0.2 to 1.0 weight percent, based on the overall weight of the starting components.

Preferably the basic catalyst is neutralized with orthophosphoric acid in the presence of a defined amount of water. Suitable for this purpose are anhydrous as well as commercially available aqueous orthophosphoric acids if the listed quantity ratios are maintained. Preferably used is sirupy (85 weight percent) ortho-phosphoric acid. Other acids such as carbonic acid ($CO_2$) may also be used.

The crude polyether polyol is mixed with 0.2 to 1.5 parts by weight of water per 100 parts of polyol, preferably 0.4 to 1.2 parts of water and, more preferably, 0.5 to 1.0 part by weight of water. The amount of orthophosphoric acid employed is from 0.3 to 1.1 mole of phosphoric acid per mole of alkaline catalyst, preferably 0.6 to 1.0 mole of acid with the pH of the mixture ranging from 12 to 5, preferably 9 to 6.

Preferably used as the adsorption agent are natural and synthetic silicas of earth alkali metals and/or aluminum. Examples include aluminum silicates such as bentonite, calcium silicates such as montmorillonite and magnesium silicates such as talc.

A synthetic magnesium silicate with the assumed formula MgO(SiO$_2$)2,7 has proven to work particularly well and is, therefore, used on a preferred basis. The adsorption agents are used in amounts of 0.05 to 0.5 part by weight, preferably of 0.1 to 0.2 part by weight per 100 parts by weight of crude polyether polyol.

The salts formed by the neutralization and the adsorption agents incorporated in the reaction mixture may be easily separated by filtration. It has proven to be advantageous to use filtration aids such as perlite, Kieselguhr and diatomaceous earths for the filtration in addition to the adsorption agents. If filtration aids are used, they are normally applied in amounts of 0.05 to 1.0 part by weight, preferably 0.1 to 2.0 part by weight per 100 parts by weight of crude polyether polyol.

The polyether polyols are advantageously prepared in such a manner that a mixture consisting of starter molecule and basic catalyst is introduced at temperatures of 60° C. to 150° C., preferably 90° C. to 130° C., and the alkylene oxide which may optionally be diluted with a gas inert under the reaction conditions such as nitrogen is introduced in the amount desired, for example, in 2 to 12 hours, preferably 6 to 10 hours, under atmospheric pressure or optionally under increased pressure at 0 to 20 bar, preferably 0 to 8 bar.

After completing the polymerization, the excess alkylene oxide is removed by stripping at temperatures of 90° C. to 150° C. under reduced pressure, for example, at 5 to 50 mbar. The water and the ortho-phosphoric acid are added to the crude polyether polyol at a temperature of 50° C. to 140° C., preferably of 70° C. to 120° C., and more preferably at 85° C. to 100° C. at atmospheric pressure or optionally under increased pressure up to 6 bar. According to the preferred mode of operation, the water is initially added to the crude polyether polyol followed by the phosphoric acid. However, it is also possible to add the water and the phosphoric acid simultaneously or to initially add the phosphoric acid and then the water to the crude polyether polyol. The reaction mixture is stirred within the mentioned temperature ranges for a period of 0.1 to 4 hours, preferably 0.5 to 1 hour, and the adsorption agent is subsequently incorporated while the mixture is stirred. It has proven to be advantageous to stir the mixture for another 0.5 to 5 hours, preferably 1 to 2 hours, after adding the adsorption agent. The reaction vessel is now optionally depressurized, a filtering aid is advantageously added to the reaction mixture, the mixture is optionally stirred for another 0.1 to 2 hours, and the resultant salts and the solid additives such as the adsorption and optionally the filtration agents are removed by means of filtration using a glass filter, a membrane filter or preferably metal filters having a mesh of 40 to 100 microns either without pressure or preferably under a pressure of 0.5 to 6 bars. In order to achieve a high filtration rate and good catalyst removal, it is essential that the water content of the reaction mixture remains basically unchanged during the neutralization and advantageously also during the filtration. As a final step, the water is removed from the polyether polyol produced as filtrate by means of stripping at a temperature of 90° C. to 130° C. under a reduced pressure of 5 to 50 mbar.

The polyether polyols purified according to the process of this invention are preferably used for the preparation of polyurethane plastics. The products have functionalities of at least 2, hydroxyl numbers of 15 to 1000 and viscosities of 100 to 350,000 mPa·s at 25° C.

The wet filter cake from the filtration is removed after a production batch is complete. The wet filter cake comprises solids such as salts resultant from the neutralization of the basic catalyst with mineral acid and may further comprise adsorption agents and filter aids. Further, the wet filter cake contains a considerable amount of polyether polyol. The removed wet filter cake is inserted into a filter press and polyether polyol is recuperated by pressing the wet filter cake. The resulting dry filter cake is removed from the press after pressing is complete. The dry filter cake is then disposed.

Recuperation of polyether polyols from the wet filter cakes is advantageous as the mass of filter cake which must be disposed as waste is reduced. Further, the amount of produced polyol per production batch is increased.

Preferably the filter cake is heated prior to pressing. The polyether polyols are viscous liquids with viscosities in the range of 100 to 350,000 mPa·s at 25° C. The viscosity decreases for increasing temperature. As a result the permeability of the filter cake is dependent on the temperature and the permeability of a filter cake increases with temperature. The temperature of the filter cake during the step of pressing is preferably in the range of from 40° C. to 90° C., especially preferred in the range of from 50° C. to 80° C. and most preferred in the range of from 60° C. to 70° C.

It is preferred that the temperature of the filter cake is maintained at during the step of pressing.

Preferably the filter cake is pressed using a pressure in the range of from 20 to 200 bar, especially preferred in the range of from 80 to 120 bar.

In the step of pressing the filter cake, the filter cake is inserted into a press and the pressing pressure is increased over a set pressing time until the maximum pressure is reached. Preferably the pressing time for pressing the filter cake is in the range of from 1 minute to 10 minutes, especially preferred in the range of from 2 minutes to 5 minutes.

The press used in the step of pressing the filter cake is preferably a high-pressure chamber press filter. Such a press comprises at least one chamber which accepts the wet filter cake. The press further comprises a piston which limits the volume of the chamber. Pressure is applied to the filter cake by moving the piston into the chamber such that the volume of the chamber decreases. The piston may be moved by hydraulic means so that high pressures may be applied to the filter cake. At least one wall of the chamber comprises a filter membrane allowing liquid to leave the chamber. The liquid comprising polyether polyols is collected. After the maximum pressure has been reached the piston is moved back and the dry filter cake is discharged. A suitable high-pressure chamber press filter which is capable of applying a pressure of up to 100 bar to the filter cake is available from HD-Filtertechnik, Germany.

Preferably the polyether polyols are recuperated from the wet filter cake by first drying the filter cake by blowing out residual polyether polyol using nitrogen and then subsequently pressing the pre-dried filter cake. Pre-drying the wet filter cake usually requires a drying time of about 60 minutes. If there is only a limited time allotted for recuperating the polyols from the filter cake it is therefore preferred not to pre-dry the filter cake and to press the wet filter cake without any further preparation and/or pre-drying step.

Preferably the production process of the polyether polyols is conducted batch-wise and the step of pressing the filter cake is performed at the end of a batch. Usually the batch ends when the filter cake has reached a certain thickness and filtration performance begins to degrade.

Further it is preferred that at least two polyether polyol production lines are used wherein the cycle time of pressing the filter cake is less than half the cycle time of a batch and wherein one filter press is shared between at least two production lines. The cycle time for pressing comprises the pressing time and a changeover time required for loading the wet filter cake into the press and for discharging the dry filter cake. This makes recuperation of the polyether polyols from the filter cakes cost efficient as the used press can be shared between several polyether polyol production lines. For example, one filter press may be used for 3 or more production lines.

The amount of residual inorganic material such as salts resulting from the neutralization of the basic catalyst in the recuperated polyether polyol may be higher than in the filtered and purified polyether polyol. It is thus preferred to measure the amount of inorganic residual material in the recuperated polyol. As the main source of inorganic material is the basic catalyst it is sufficient to determine the amount of residual inorganic material of the catalyst in the recuperated polyether polyol. For example the amount of potassium ions is determined in the case of potassium hydroxide as catalyst and the amount of sodium ions is determined in case of sodium hydroxide as catalyst. The measured amount of ions is given as Na/K level in ppm (part per million). In addition it is preferred to measure the viscosity of the recuperated polyether polyols.

Typically the amount of inorganic residual material in the recuperated polyether polyols is higher than the specified limit value for purified polyether polyols.

Preferably the recuperated polyether polyol is blended with the purified polyether polyol such that the viscosity and/or residual amounts residual inorganic material of the blended polyether polyol are within specified ranges.

In order to avoid long storage times of recuperated polyether polyol it is preferred to press the filter cake at the end of a batch and to blend the recuperated polyether polyol with the filtered polyether polyol of the subsequent batch. Recuperated polyether polyol of the last batch of a production cycle is preferably stored and blended with filtered polyether polyol of the first batch of a subsequent production cycle.

After the step of pressing the filter cake, the then dry filter cake is disposed as waste. The residual amount of polyether polyol in the dry filter cake after pressing is preferably less than 40% by weight, especially preferred less than 30% by weight and most preferred less than 20% by weight.

EXAMPLES

Several polyether polyol products where produced as examples A to G using a main reactor for synthesis of the polyether polyols, a filtration reactor with filtration unit, a filtration press and a workup reactor.

In the main reactor a mixture consisting of starter molecules, basic catalyst and alkylene oxide is introduced. After completing the polymerization, the excess alkylene oxide is removed and the crude polyether polyol is fed into the filtration reactor.

In the filtration reactor water and ortho-phosphoric acid or $CO_2$ are added to the crude polyether polyol.

The reaction mixture is stirred for a time. Water is removed to form the salts. After the salts are formed an adsorption agent and filter aid is added to the reaction mixture. The salts resulting from the neutralization and the solid additives such as the adsorption agent and optionally the filtration aids are removed by means of filtration. Water is removed from the purified polyether polyol produced as filtrate in the workup reactor.

The filter cake is removed from the filtration unit. For each example A to G several samples of wet filter cake have been taken. The weight of each of the wet filter cake samples is determined and for some samples the wet filter cake has been pre-dried by blowing nitrogen gas through the wet filter cake. The wet or pre-dried filter cake samples are then inserted into the chamber of a high pressure chamber filter press. The amount of recuperated polyether polyol is measured as well as the weight of the dry filter cake after pressing.

The amount of polyol which is recuperated is determined by subtracting the mass $m_{dc}$ of the wet filter cake from the mass $m_i$ of the wet filter cake. This can be expressed in percent of the initial wet filter cake mass $m_i$ using the relation $$R_{polyol} = \frac{m_i - m_{dc}}{m_i} 100. \tag{1}$$

The mass flow of filter cake $m_f$ which can be processed by the filter press is dependent on the pressing time $t_p$ and the changeover time $t_c$ required to insert the wet filter cake and to remove the dry filter cake. The mass flow per hour can be expressed using the relation $$\dot{m}_f = \frac{3600}{t_p + t_c} m_i \tag{2}$$

wherein the changeover time $t_c$ and the pressing time $t_p$ are given in seconds. Thus, the mass flow of recuperated polyol per hour is given by $$\dot{m}_{polyol} = \frac{3600}{t_p + t_c} m_i \frac{R_{polyol}}{100}. \tag{3}$$

In the following, the changeover time $t_c$ is assumed to be half of the pressing time $t_p$ so that the mass flow of recuperated polyol per hour is given by $$\dot{m}_{polyol} = \frac{2400}{t_p} m_i \frac{R_{polyol}}{100}. \tag{4}$$

In addition, the amount of polyether polyol in the wet filter cake and in the dry filter cake have been analyzed in laboratory measurements wherein the polyol was extracted from a known amount of the filter cake using dichloromethane. The dichloromethane was then evaporated using a nitrogen flow and the mass of the extracted polyol has been measured. The laboratory measurements were performed twice for each sample to account for inhomogeneity in the sample. The polyol content for the dry filter cakes was determined on the actual sample after pressing, while measurements for the wet filter cake were performed on a different sample.

The amount of recuperated polyol based on the lab measurements is then calculated as follows $$R_{polyol,lab} = \frac{m_{pi} - m_{pd}}{m_i} 100 \quad (5)$$

wherein $m_{pi}$ is the mass of polyol in the wet filter cake and $m_{pd}$ is the mass of polyol in the dry filer cake and $R_{polyol,\,lab}$ is the recuperated polyol in percent.

Samples Used:

The filter cake samples have been prepared by producing at least one batch of polyether polyols for each example using the parameters listed in table 1 wherein at least two samples were taken. Table 1 also lists the molecular weight of the polyol. In case of example G, two batches have been produced and the samples were taken from those two batches. In case of examples E, F and G some samples were pre-dried using nitrogen.

TABLE 1

| Example | # of samples | Starter molecule | Alkylene oxide | Molecular weight [g/mol] |
|---|---|---|---|---|
| A | 12 | glycerin | PO/EO | 3410 |
| B | 6 | glycerin | PO/EO | 5390 |
| C | 2 | glycerin | PO/EO | 5170 |
| D | 7 | glycerin | PO/EO | 3550 |
| E | 10 | glycerin | PO/EO | 4360 |
| F | 6 | glycerin | PO | 1070 |
| G | 12 | glycerin | PO/EO | 5390 |

For all examples potassium hydroxide has been used as basic catalyst and $CO_2$ has been used as acid. Further, for all examples magnesium silicate has been added as filtration aid.

The properties of the polyols of the examples are listed in table 2. The average residual value of potassium ions (Na/K level) has been averaged over the measured values for purified polyether polyols of several batches.

TABLE 2

| Example | Average Na/K [ppm] |
|---|---|
| A | 4.3 |
| B | 4.36 |
| C | 3.68 |
| D | 9.37 |
| E | 3.37 |
| F | 3.63 |
| G | 3.04 |

Pressing of the Samples

For examples A to D only wet filter cake samples were used. 3 samples of example E, 2 samples of example F and 6 samples of example G were pre-dried by blowing nitrogen gas through the filter cake.

The wet or pre-dried filter cake sample was inserted into the chamber of a high pressure chamber filter press. FIG. 1 shows a schematic view of a high pressure filter press 10 comprising a cylindrical housing 20. A chamber 12 is located inside the cylindrical housing 20. The chamber 12 is also of cylindrical shape with a diameter D. The chamber 12 is terminated on one side by a fixed end 22 and on the other side by a movable piston 14. The depth d of the chamber 12 can be adjusted by moving the piston 14. A filter cake inserted into the chamber 12 is pressed by applying a force F to piston 14. Polyether polyols are pressed out of the filter cake and leave the chamber 12 through filters 16 and drains 18. After pressing the piston 14 is moved back to its original position and the pressed filter cake is discharged from chamber 12. The recuperated polyols are collected and the amount of recuperated polyols is measured.

The chamber of the high pressure filter press used for the pressing of the samples has a diameter D of 135 mm and the maximum applied pressure was 100 bar. The depth of the chamber, temperature of the filter cake and pressing time were varied. After pressing, the height h of the pressed filter cake and the mass $m_{dc}$ of the dried filter cake was determined. The filter cakes were heated prior to insertion into the chamber and the initial temperature was determined. The temperature decreased during pressing and the temperature of the pressed dry filter cake was measured at the end of the pressing step. The diameter of the pressed dry filter cake corresponds to the diameter of the chamber.

Example A

The measurement results for the samples of example A are listed in table 3:

TABLE 3

| | Sample # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $m_i$ [g] | 250 | 250 | 300 | 300 | 350 | 350 | 400 | 400 | 500 | 600 | 700 | 400 |
| T [° C.] (start) | 52 | 52 | 45 | 53 | 56 | 51 | 55 | 54 | 51 | 60 | 58 | 54 |
| T [° C.] (end) | 24 | 24 | | 28 | 27 | 26 | 26 | 26 | 25 | 30 | | 25 |
| $T_p$ [s] | 180 | 180 | 300 | 300 | 320 | 360 | 360 | 380 | 420 | 400 | 540 | 300 |
| $m_{dc}$ [g] | 36 | 81 | 89 | 98 | 127 | 117 | 112 | 129 | 160 | 206 | 238 | 135 |
| d [mm] | | | | | | | | | 30 | 35 | 40 | 50 | 30 |
| h [mm] | 3.4 | 3.9 | 4.1 | 4.37 | 6.6 | 4.5 | 5.0 | 6.0 | 7.6 | 10.5 | 11.3 | 6.7 |

Example B

The measurement results for the samples of example B are listed in table 4:

TABLE 4

| | Sample # | | | | | |
|---|---|---|---|---|---|---|
| | 1 | 2 | 3 | 4 | 5 | 6 |
| $m_i$ [g] | 300 | 400 | 400 | 500 | 600 | 300 |
| T [° C.] (start) | 64 | 64 | 65 | 66 | 65 | 64 |
| T [° C.] (end) | 25 | 24 | 29 | 28 | 28 | 28 |
| $T_p$ [s] | 180 | 300 | 300 | 320 | 390 | 360 |
| $m_{dc}$ [g] | 121 | 163 | 163 | 199 | 246 | 115 |
| d [mm] | 20 | 25 | 25 | 30 | 40 | 20 |
| h [mm] | 5.7 | 8.0 | 8.0 | 9.8 | 11.8 | 6.0 |

Example C

The measurement results for the samples of example C are listed in table 5:

TABLE 5

| | Sample # | |
|---|---|---|
| | 1 | 2 |
| $m_i$ [g] | 300 | 300 |
| T [° C.] (start) | 63 | 64 |
| T [° C.] (end) | 23 | 24 |
| $T_p$ [s] | 450 | 480 |
| $m_{dc}$ [g] | 165 | 179 |
| d [mm] | 30 | 30 |
| h [mm] | 8.8 | 9.4 |

Example D

The measurement results for the samples of example D are listed in table 6:

TABLE 6

| | Sample # | | | | | | |
|---|---|---|---|---|---|---|---|
| | 1 | 2 | 3 | 4 | 5 | 6 | 7 |
| $m_i$ [g] | 400 | 400 | 400 | 400 | 400 | 500 | 400 |
| T [° C.] (start) | 58 | 58 | 58 | 52 | 54 | 51 | 50 |
| T [° C.] (end) | 23 | 23 | 23 | 25 | 25 | 29 | 25 |
| $T_p$ [s] | 240 | 250 | 240 | 251 | 248 | 240 | 220 |
| $m_{dc}$ [g] | 217 | 209 | 234 | 224 | 228 | 276 | 233 |
| d [mm] | 30 | 30 | 30 | 30 | 30 | 40 | 30 |
| h [mm] | 9.2 | 9.6 | 9.9 | 9.6 | 9.8 | 12.0 | 10.0 |

Example E

The measurement results for the samples of example E are listed in table 7 and 8. The measurements listed in table 7 were performed by pressing wet filter cakes.

TABLE 7

| | Sample # | | | | | | | | | |
|---|---|---|---|---|---|---|---|---|---|---|
| | 1 | 2 | 3 | 4 | 5 | 6 | 7 | 8 | 9 | 10 |
| $m_i$ [g] | 300 | 300 | 300 | 400 | 500 | 500 | 500 | 200 | 300 | 300 |
| T [° C.] (start) | 86 | 86 | 86 | 74 | 60 | 60 | 62 | 68 | 65 | 67 |
| T [° C.] (end) | 36 | 36 | 36 | 30 | 30 | 30 | 27 | 30 | 30 | 30 |
| $T_p$ [s] | 120 | 120 | 120 | 180 | 230 | 240 | 250 | 120 | 200 | 180 |
| $m_{dc}$ [g] | 149 | 147 | 148 | 203 | 259 | 255 | 270 | 142 | 263 | 256 |
| d [mm] | 20 | 20 | 20 | 25 | 30 | 30 | 30 | 15 | 25 | 25 |
| h [mm] | 6.7 | 7.4 | 7.0 | 9.5 | 12.0 | 12.3 | 12.5 | 7.6 | 12.0 | 11.5 |

The measurements listed in table 8 were performed by pressing pre-dried filter cakes:

TABLE 8

| | Sample # | | |
|---|---|---|---|
| | 1 | 2 | 3 |
| $m_i$ [g] | 200 | 300 | 300 |
| T [° C.] (start) | 68 | 65 | 67 |
| T [° C.] (end) | 30 | 30 | 30 |
| $T_p$ [s] | 120 | 200 | 180 |
| $m_{dc}$ [g] | 142 | 263 | 256 |
| d [mm] | 15 | 25 | 25 |
| h [mm] | 7.6 | 12.0 | 11.5 |

Example F

The measurement results for the samples of example F are listed in tables 9 and 10. The measurements listed in table 9 were performed by pressing wet filter cakes.

TABLE 9

| | Sample # | | | |
|---|---|---|---|---|
| | 1 | 2 | 3 | 4 |
| $m_i$ [g] | 600 | 700 | 700 | 700 |
| T [° C.] (start) | 65 | 65 | 43 | 65 |
| T [° C.] (end) | 45 | 45 | 43 | 50 |
| $T_p$ [s] | 80 | 80 | 100 | 80 |
| $m_{dc}$ [g] | 150 | 219 | 192 | 201 |

TABLE 9-continued

| | Sample # | | | |
|---|---|---|---|---|
| | 1 | 2 | 3 | 4 |
| d [mm] | 40 | 45 | 45 | 45 |
| h [mm] | 6.8 | 9.8 | 8.3 | 9.0 |

The measurements listed in table 10 were performed by pressing pre-dried filter cakes:

TABLE 10

| | Sample # | |
|---|---|---|
| | 1 | 2 |
| $m_i$ [g] | 400 | 500 |
| T [° C.] (start) | 65 | 65 |
| T [° C.] (end) | 45 | 48 |
| $T_p$ [s] | 60 | 60 |
| $m_{dc}$ [g] | 221 | 284 |
| d [mm] | 25 | 30 |
| h [mm] | 9.2 | 11.8 |

Example G

The measurement results for the samples of example G are listed in tables 11 and 12. The measurements listed in table 11 were performed by pressing wet filter cakes.

TABLE 11

| | Sample # | | | | | |
|---|---|---|---|---|---|---|
| | 1 | 2 | 3 | 4 | 5 | 6 |
| $m_i$ [g] | 300 | 400 | 500 | 500 | 500 | 500 |
| T [° C.] (start) | 65 | 67 | 67 | 69 | 62 | 60 |
| T [° C.] (end) | | 34 | 36 | 36 | 48 | 53 |
| $T_p$ [s] | 140 | 180 | 200 | 200 | 230 | 180 |
| $m_{dc}$ [g] | 88 | 109 | 143 | 185 | 165 | 155 |
| d [mm] | 20 | 30 | 40 | 40 | 40 | 40 |
| h [mm] | 4.0 | 5.7 | 6.8 | 7.25 | 6.9 | 7.3 |

The measurements listed in table 12 were performed by pressing pre-dried filter cakes:

TABLE 12

| | Sample # | |
|---|---|---|
| | 1 | 2 |
| $m_i$ [g] | 300 | 400 |
| T [° C.] (start) | 60 | 60 |
| T [° C.] (end) | 32 | 45 |
| $T_p$ [s] | 120 | 150 |
| $m_{dc}$ [g] | 162 | 218 |
| d [mm] | 20 | 30 |
| h [mm] | 7.8 | 10.0 |

Measurement Results

For each example A to G an average value of recuperated polyether polyol $R_{polyol}$ in % of the initial mass $m_i$ of the filter cake calculated according to equation (1) is given. This average value is calculated over all samples for each example even though the measurement conditions are different for each sample. The results are listed in table 13. Further, table 13 gives the average value of recuperated polyether polyol $R_{polyol, lab}$ according to lab results according to equation (5).

TABLE 13

| | | Standard deviation | |
|---|---|---|---|
| Example | $R_{polyol}$ | $R_{polyol}$ | $R_{polyol,lab}$ |
| A | 67.57% | 2.24% | 57.14% |
| B | 59.84% | 0.99% | 51.43% |
| C | 42.67% | 3.3% | 47.42% |
| D | 44.08% | 2.24% | 65.11% |
| E | 49.21% | 1.73% | 50.13% |
| E (with nitrogen) | 18.67% | 9.02% | 6.97% |
| F | 71.89% | 2.62% | 91.58% |
| F (with nitrogen) | 43.98% | 1.10% | 26.91% |
| G | 68.97% | 3.54% | 69.09% |
| G (with nitrogen) | 46.69% | 4.51% | 42.13% |

For most of the examples the lab results which have been obtained by extracting the residual polyols using dichloromethane compare well with the results obtained by pressing. The average value over the different examples shows that around 51% of the initial filter cake mass $m_i$ can be recuperated as polyol.

Figure 2:
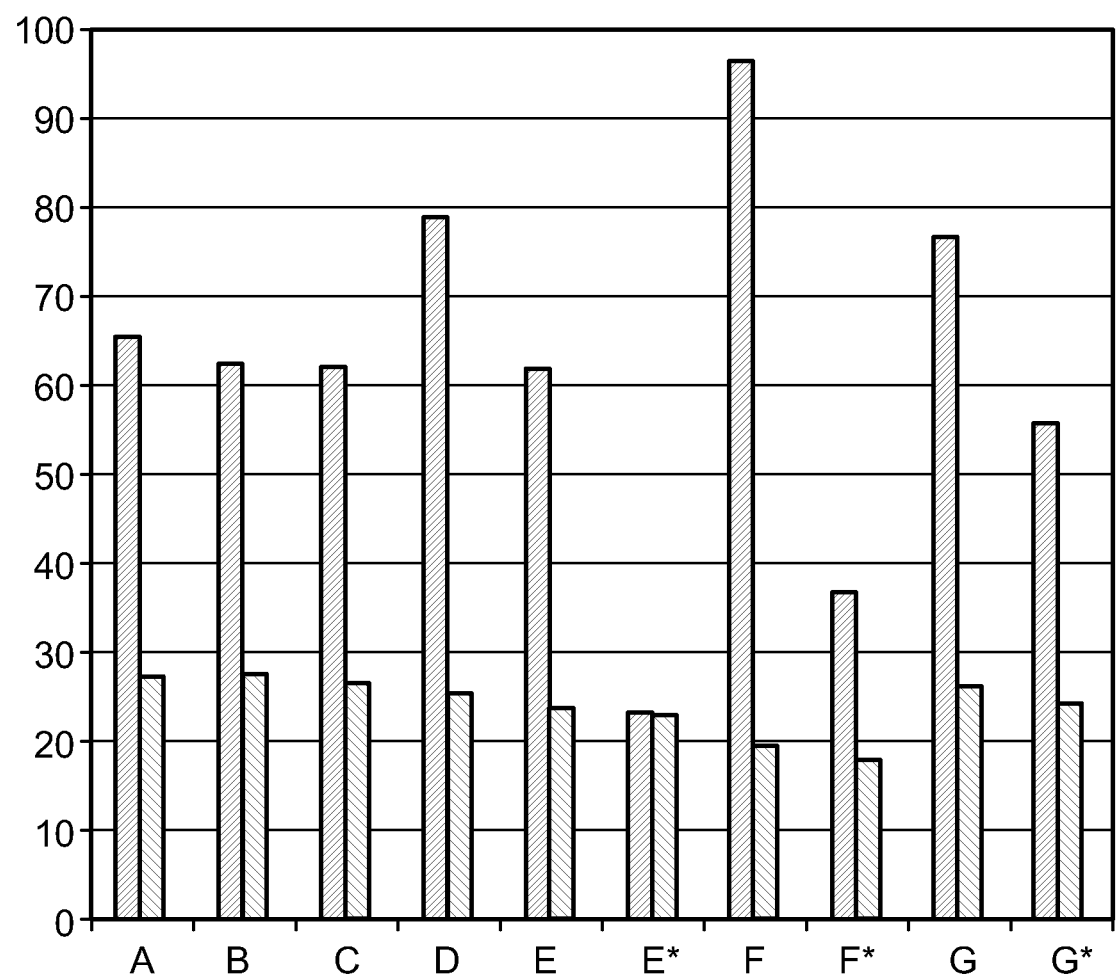
FIG. 2 shows the results for examples E to G wherein the samples have been pre-dried using nitrogen.

In FIG. 2 a bar diagram is shown wherein for each example a first bar (left) depicts the weight percent of the polyol in the wet/pre-dried cake and a second bar (right) depicts the weight percent of the polyol in the pressed cake. Additionally, FIG. 2 depicts the results for examples E to G wherein the samples have been pre-dried using nitrogen. These results have been marked with a * in the figure. It can be seen in FIG. 2 that there is some variation of polyol recuperation between products.

In order to assess the quality of the recuperated polyols, the residual amount of potassium ions (Na/K level) has been determined.

Figure 3:
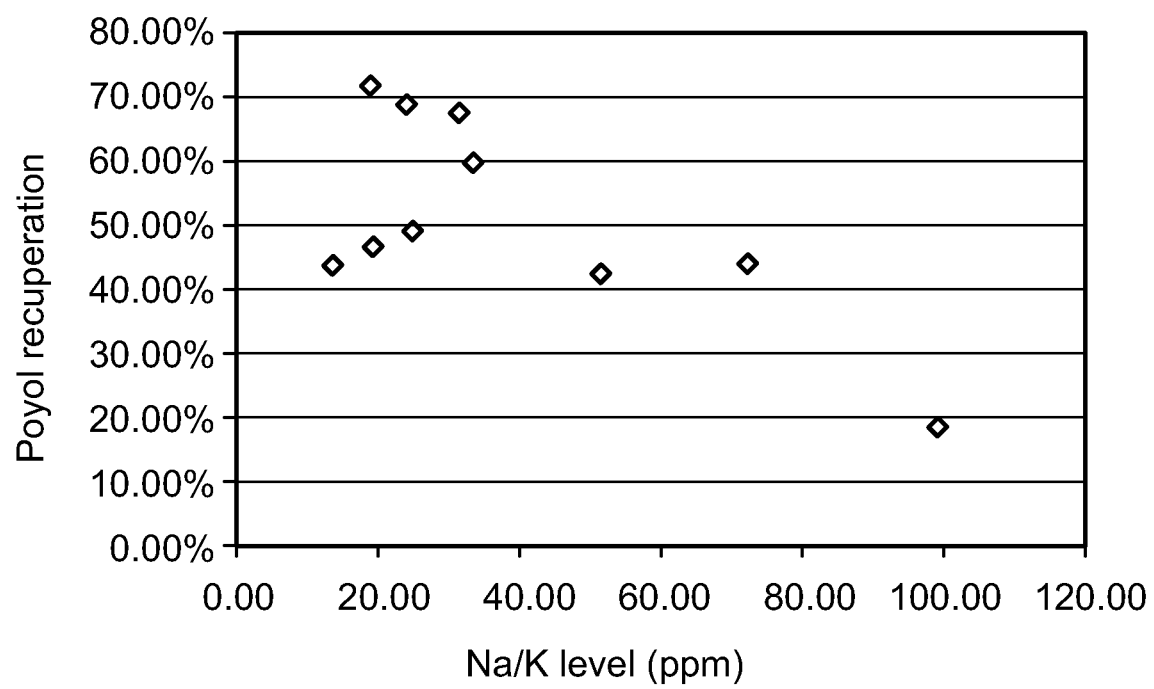
FIG. 3 shows a diagram wherein the recuperated polyol in % is plotted vs. Na/K level in ppm for each example including in addition the results for the pre-dried samples of examples E to G.

FIG. 3 shows a diagram wherein the recuperated polyol in % is plotted vs. Na/K level in ppm for each example including in addition the results for the pre-dried samples of examples E to G. A weak relation between Na/K levels in the final recuperated polyol can be seen. Na/K levels are higher for examples with worse polyol recuperation.

Figure 4:
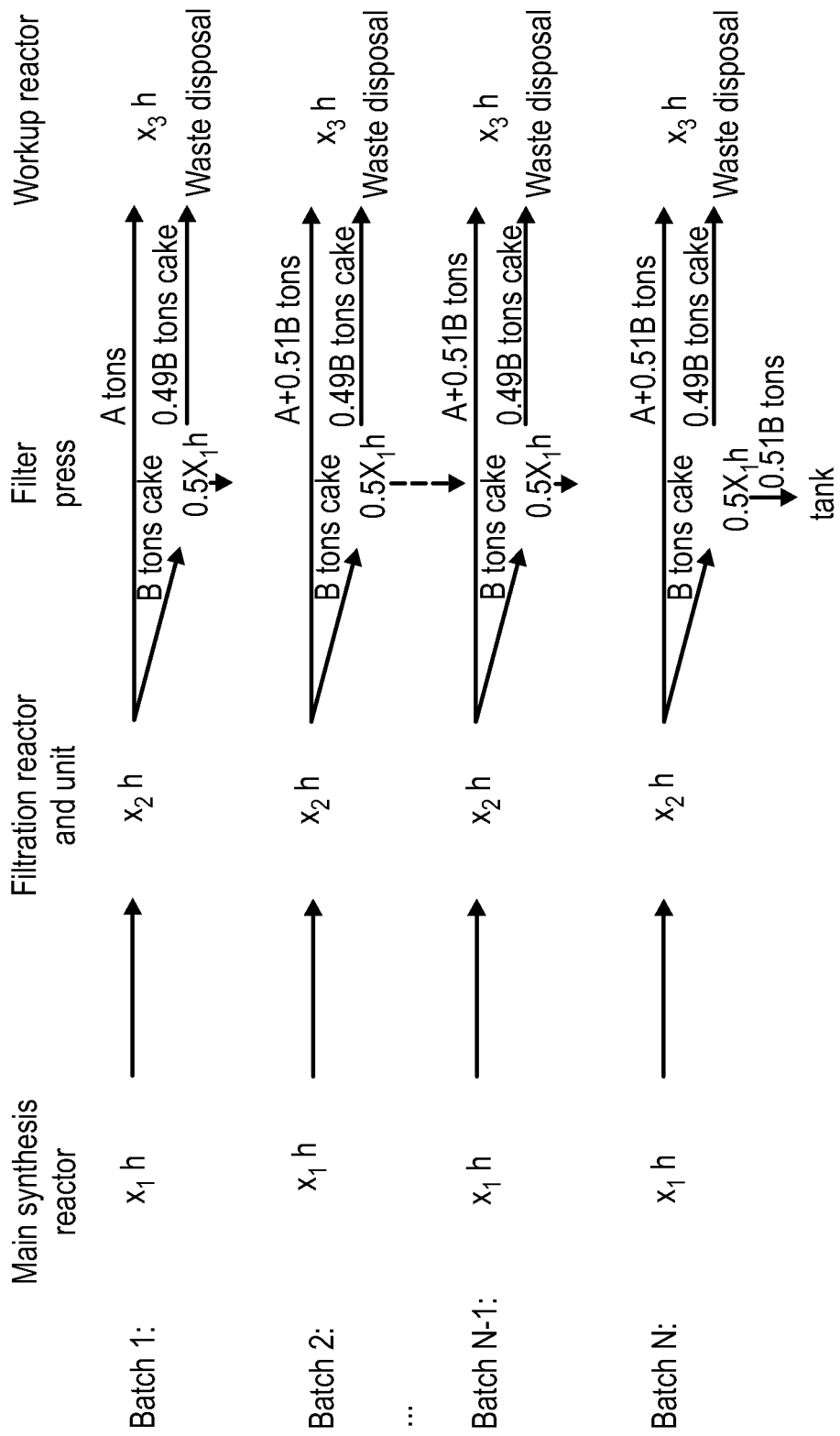
FIG. 4 shows a schematic flow diagram for a production campaign with N batches wherein polyether polyols are recuperated and blended with filtered polyols of a subsequent batch.

FIG. 4 shows a schematic flow diagram for a production campaign with N batches wherein polyether polyols are recuperated and blended with filtered polyols of a subsequent batch. For each batch the steps of synthesis, filtration and workup are performed. Each step requires a set amount of time which is in the diagram of FIG. 4 expressed as a product of total time h and a fraction $X_1$, $X_2$ and $X_3$ respectively. The synthesis step performed in the main synthesis reactor takes up most of the time. Thus, $X_1 > X_2$ and $X_1 > X_3$. Preferably the total time required for pressing the filter cake in the filter press is equal to or less than $X_1/2$ allowing a single filter press to be shared between two production lines.

In the diagram of FIG. 4 A tons of filtered polyols and B tons of filter cake are obtained for each batch. If it is assumed that 51% by weight of polyols can be recuperated from the wet filter cake and the recuperated polyols are blended with the filtered polyols, a total amount of A+0.51·B tons of purified polyols can be obtained by the proposed method and only 0.49·B tons of filter cake have to be disposed of as waste. Typically, the amount B of obtained filter cake is about 1% by weight of the filtered polyols A. The recuperated polyols are blended with the filtered polyols of the subsequent batch. For the last batch, the recuperated polyols may be stored in a tank.

In table 14 the measured Na/K level for recuperated polyols and the average Na/K value for filtered purified polyols are listed.

TABLE 14

| Example | Na/K for recuperated polyols [ppm] | Average Na/K [ppm] of filtered polyols |
| --- | --- | --- |
| A | 31.25 | 4.3 |
| B | 33.17 | 4.36 |
| C | 51.00 | 3.68 |
| D | 71.71 | 9.37 |
| E | 24.71 | 3.37 |
| E (with nitrogen) | 98.67 | 3.37 |
| F | 18.75 | 3.63 |
| F (with nitrogen) | 13.50 | 3.63 |
| G | 23.83 | 3.04 |
| G (with nitrogen) | 19.17 | 3.04 |

It can be seen that the Na/K levels of the recuperated polyols are higher than the respective Na/K levels of the filtered polyols. Preferably the recuperated polyols are blended with the filtered polyols in the work-up reactors.

In table 15 the average cake mass flow in grams per hour and the average mass flow of the recuperated polyols are listed. The flow rates have been calculated according to equations (2) and (3) respectively, assuming that the changeover time $t_c$ is half of the pressing time $t_p$.

TABLE 15

| Example | Average cake mass flow (g/h) | Average polyol mass flow (g/h) |
| --- | --- | --- |
| A | 2849 | 1924 |
| B | 3307 | 1975 |
| C | 1550 | 663 |
| D | 4128 | 1819 |
| E | 5479 | 2703 |
| E (with nitrogen) | 3867 | 730 |
| F | 19200 | 13773 |
| F (with nitrogen) | 18000 | 7900 |
| G | 5727 | 3946 |
| G (with nitrogen) | 3900 | 1823 |

The invention claimed is:

1. A process for purifying a crude polyether polyol prepared by anionic polymerization of an alkylene oxide in the presence of a basic catalyst, the process comprising
neutralizing the catalyst with a mineral acid to form a salt,
adding an adsorption agent and/or a filter aid,
removing the salt and the adsorption agent and/or the filter aid by filtration to form a filter cake, and
subsequently pressing the filter cake to recuperate the polyether polyol from the filter cake.

2. The process of claim 1, further comprising:
heating the filter cake prior to pressing the filter cake.

3. The process of claim 2, wherein a temperature of the filter cake during said pressing ranges from 40° C. to 90° C.

4. The process of claim 1, wherein the filter cake is pressed using a pressure ranging from 20 to 200 bar.

5. The process of claim 1, wherein the filter cake is pressed for 1 minute to 10 minutes.

6. The process of claim 1, wherein a high-pressure chamber press filter is used for pressing the filter cake.

7. The process of claim 1, wherein the polyether polyol is recuperated from the filter cake by first drying the filter cake by blowing out residual polyether polyol using nitrogen and then subsequently pressing the filter cake.

8. The process of claim 1, wherein the process is conducted batch-wise, and said pressing is performed at the end of a batch.

9. The process of claim 8, wherein a cycle time of pressing the filter cake is less than half a cycle time of a batch and one filter press is shared between at least two production lines.

10. The process of claim 1, further comprising:
blending the recuperated polyether polyol with filtered polyether polyol to obtain a blended polyether polyol such that viscosity and/or residual amounts of the basic catalyst of the blended polyether polyol are within specified ranges.

11. The process of claim 10, wherein the process is conducted batch-wise, the filter cake is pressed at the end of a batch, and the recuperated polyether polyol is blended with purified polyether polyol of a subsequent batch.

12. The process of claim 11, wherein the recuperated polyether polyol of the last batch of a production cycle is stored and blended with filtered polyether polyol of the first batch of a subsequent production cycle.

13. The process of claim 1, wherein a residual amount of polyether polyol in the filter cake after pressing is less than 40% by weight.

14. The process of claim 1, wherein the basic catalyst is potassium hydroxide.

15. The process of claim 1, wherein the alkylene oxide is ethylene oxide, propylene oxide, or a mixture of ethylene oxide and propylene oxide.

16. The process of claim 1, wherein the filter cake after removing the salt and the adsorption agent and/or the filter aid by a filtration is wet filter cake, and the wet filter cake is removed from the filtration and inserted into a press for the subsequent pressing of the wet filter cake.

17. The process of claim 1, wherein the filtration comprises a plate filter, a candle filter or a chamber filter.

* * * * *